United States Patent
Park

(10) Patent No.: US 12,155,284 B2
(45) Date of Patent: Nov. 26, 2024

(54) MOTOR

(71) Applicant: LG INNOTEK CO., LTD., Seoul (KR)

(72) Inventor: Kyoung Min Park, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 0 days.

(21) Appl. No.: 17/754,933

(22) PCT Filed: Oct. 14, 2020

(86) PCT No.: PCT/KR2020/014002
§ 371 (c)(1),
(2) Date: Apr. 15, 2022

(87) PCT Pub. No.: WO2021/075848
PCT Pub. Date: Apr. 22, 2021

(65) Prior Publication Data
US 2024/0048015 A1 Feb. 8, 2024

(30) Foreign Application Priority Data
Oct. 15, 2019 (KR) .................. 10-2019-0127906

(51) Int. Cl.
*H02K 3/50* (2006.01)
(52) U.S. Cl.
CPC ........... *H02K 3/50* (2013.01); *H02K 2203/09* (2013.01)
(58) Field of Classification Search
CPC ....... H02K 3/50; H02K 3/522; H02K 2203/09
See application file for complete search history.

(56) References Cited

U.S. PATENT DOCUMENTS

| 9,079,603 | B2 | 7/2015 | Isshiki et al. |
| 9,225,217 | B2 | 12/2015 | Tomita et al. |
| 2013/0328425 | A1* | 12/2013 | Tomita ..................... H02K 3/52 310/71 |

FOREIGN PATENT DOCUMENTS

| JP | 2010-239771 A | 10/2010 |
| JP | 2013-9495 A | 1/2013 |
| JP | 2015-35881 A | 2/2015 |
| JP | 2019-47658 A | 3/2019 |
| KR | 10-1897540 B1 | 9/2018 |

(Continued)

OTHER PUBLICATIONS

Supplementary European Search Report dated Nov. 11, 2022 in European Application No. 20876037.1.

(Continued)

*Primary Examiner* — Jue Zhang
(74) *Attorney, Agent, or Firm* — Saliwanchik, Lloyd & Eisenschenk

(57) ABSTRACT

The present invention may provide a motor including a shaft, a rotor coupled to the shaft, a stator disposed to correspond to the rotor, and a busbar disposed above the stator, wherein the stator includes a stator core and coils, the busbar includes a terminal connected to the coils, the terminal includes bodies and a plurality of connection ends which extend from the bodies and are in contact with end portions of the coils, a plurality of extension parts extending from the plurality of bodies are combined to constitute any one of the plurality of connection ends, and the plurality of extension parts are in contact with the same end portion of the coil.

14 Claims, 9 Drawing Sheets

(56) References Cited

FOREIGN PATENT DOCUMENTS

| | | |
|---|---|---|
| WO | 2014/057978 A1 | 4/2014 |
| WO | 2017/026412 A1 | 2/2017 |

OTHER PUBLICATIONS

International Search Report dated Jan. 20, 2021 in International Application No. PCT/KR2020/014002.
Office Action dated Sep. 3, 2024 in Japanese Application No. 2022-522751.

* cited by examiner

MOTOR

CROSS-REFERENCE TO RELATED APPLICATIONS

This application is the U.S. national stage application of International Patent Application No. PCT/KR2020/014002, filed Oct. 14, 2020, which claims the benefit under 35 U.S.C. § 119 of Korean Application No. 10-2019-0127906, filed Oct. 15, 2019, the disclosures of each of which are incorporated herein by reference in their entirety.

TECHNICAL FIELD

The present invention relates to a motor.

BACKGROUND ART

A motor includes a rotor and a stator. Coils are wound around the stator. Connection ends of the coils wound around the stator may be connected to a busbar. The busbar includes a body and terminals. The terminals are connected to the coils. The terminals include bodies and a plurality of connection ends extending from the bodies. The bodies of the terminals have substantially curved surfaces, and connection ends have shapes branched off from the bodies. Accordingly, there is a problem that a shape of a development figure of a plate member for manufacturing the terminals is very complicated. When the shape of the development figure becomes complicated, a manufacturing process is complicated, and thus, there is a problem that a large amount of scraps is generated in a terminal manufacturing process.

In addition, due to bent patterns of the connection ends, a length of the busbar in an axial direction increases, and thus there is a problem of an increase in size of a motor.

DISCLOSURE

Technical Problem

The present invention is directed to providing a motor including a terminal of which a manufacturing process generates a small amount of scraps.

Objectives to be solved by the present invention are not limited to the above-described objectives, and other objectives which are not described above will be clearly understood by those skilled in the art from the following specification.

Technical Solution

One aspect of the present invention provides a motor including a shaft, a rotor coupled to the shaft, a stator disposed to correspond to the rotor, and a busbar disposed above the stator, wherein the stator includes a stator core and coils, the busbar includes a terminal connected to the coils, the terminal includes bodies and a plurality of connection ends which extend from the bodies and are in contact with end portions of the coils, a plurality of extension parts extending from the plurality of bodies are combined to constitute any one of the plurality of connection ends, and the plurality of extension parts are in contact with the same end portion of the coil.

Another aspect of the present invention provides a motor including a shaft, a rotor coupled to the shaft, a stator disposed to correspond to the rotor, and a busbar disposed above the stator, wherein the stator includes a stator core and coils, the busbar includes a first terminal and a second terminal which are connected to the coils, the first terminal includes a first body and a first extension part extending from one end portion of the first body, the second terminal includes a second body and a second extension part extending from one end portion of the second body, and the first extension part and the second extension part are in contact with the same end portion of the coil.

Still another aspect of the present invention provides a motor including a shaft, a rotor coupled to the shaft, a stator disposed to correspond to the rotor, and a busbar disposed above the stator, wherein the stator includes a stator core and coils, the busbar includes a first terminal and a second terminal which are connected to the coils, and an overlap region of the first terminal and the second terminal in an axial direction is in contact with the same end portion of the coil.

Widths of the plurality of bodies may be the same, and a width of the extension part may be smaller than a width of the body.

A width of the connection end formed of the extension part may be smaller than the width of the body.

A width of the first body may be the same as a width of the second body, a width of the first extension part may be smaller than a width of the first body, and a width of the second extension part may be smaller than a width of the second body.

A sum of the width of the first extension part and the width of the second extension part may be smaller than the width of the first body or the width of the second body.

The first extension part and the second extension part may be disposed to overlap in an axial direction.

The first terminal may include a third extension part extending from the other end portion of the first body, the second terminal may include a fourth extension part extending from the other end portion of the second body, a width of the first extension part and a width of the second extension part may be the same, and the width of the second extension part and a width of the fourth extension part may be different from each other.

The first extension part may include a first bent part connected to the first body and a second bent part connected to the first bent part, the second extension part may include a third bent part connected to the second body and a fourth bent part connected to the third bent part, a direction in which the first bent part is bent and a direction in which the third bent part is bent may be opposite to each other in a circumferential direction of the shaft, and a direction in which the second bent part is bent and a direction in which the fourth bent part is bent may be the same based on the circumferential direction of the shaft.

A curvature of the second bent part and a curvature of the fourth bent part may be the same.

A lower surface of the first extension part may be in contact with an upper surface of the second extension part.

The second terminal, the first terminal, and the second terminal may be disposed in order in a circumferential direction of the busbar.

In the overlap region, a lower surface of the first terminal and an upper surface of the second terminal may be in contact.

A width of the first terminal and a width of the second terminal may be the same, and a width of the overlap region may be smaller than the width of the first terminal or the width of the second terminal.

Advantageous Effects

According to embodiments, since the present invention includes a terminal of which a manufacturing process generates a small amount of scraps, the present invention provides an advantageous effect of significantly reducing manufacturing costs.

According to the embodiments, since the number of bending processes for forming connection ends of the terminal is reduced, there are advantageous effects in that the number of manufacturing processes is reduced and damage to the terminal occurring in the bending processes can be inhibited.

According to the embodiments, since a length of a busbar in an axial direction is reduced, a size of a motor can be reduced.

MODES OF THE INVENTION

A direction parallel to a longitudinal direction (vertical direction) of a shaft is referred to as an axial direction, a direction perpendicular to the axial direction about a center of the shaft is referred to as a radius direction, and a direction along a circumference of a circle having a radius about the shaft is referred to as a circumferential direction.

Figure 1:
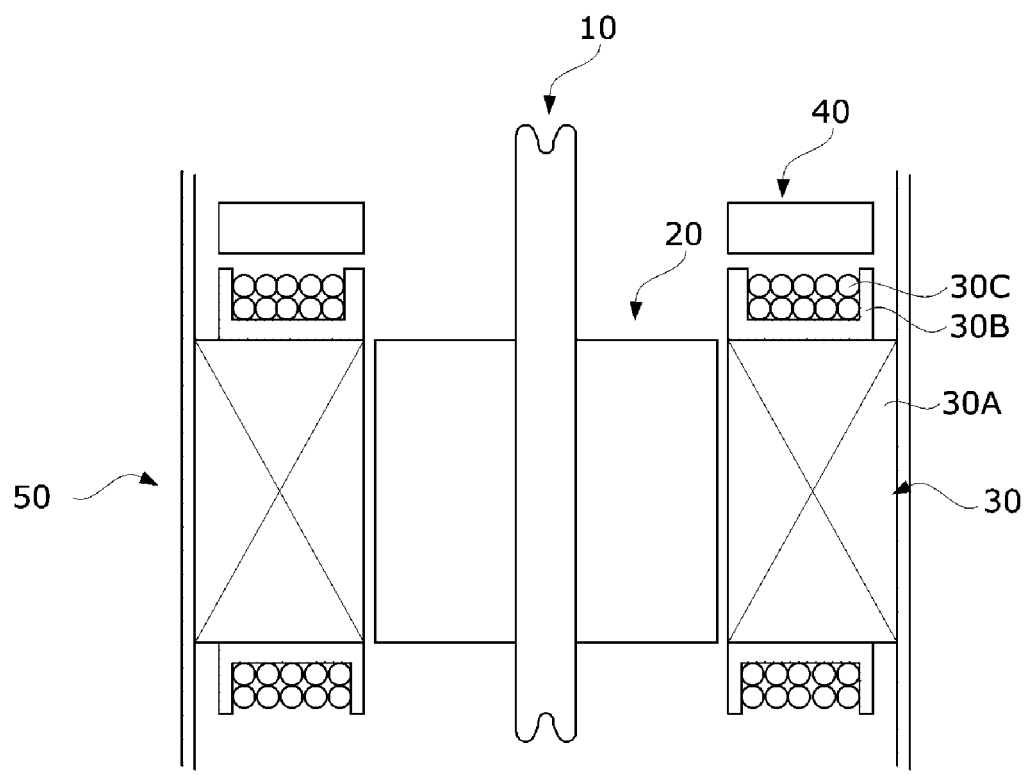
FIG. 1 is a view illustrating a motor according to an embodiment.

FIG. 1 is a view illustrating a motor according to an embodiment. Hereinafter, the term "inward" refers to a direction from a housing 500 toward a shaft 10 which is a center of the motor, and the term "outward" refers to a direction opposite to "inward," that is, a direction from the shaft 10 toward the housing 50. In addition, the circumferential direction or radial direction is defined based on an axial center.

The shaft 10 may be coupled to a rotor 20. When an electromagnetic interaction occurs between the rotor 20 and the stator 30 when a current is supplied, the rotor 20 rotates, and the shaft 10 rotates in conjunction with the rotor 20.

The rotor 20 rotates due to the electrical interaction with the stator 30. The rotor 20 may be disposed inside the stator 30.

The stator 30 is disposed outside the rotor 20. The stator 30 may include a stator core 30A, insulators 30B installed on the stator core 30A, and coils 30C. The coils 30C may be wound around the insulators 30B. The insulators 30B are disposed between the coils 30C and the stator core 30A and serve to electrically insulate the stator core 30A from the coils 30C. The coils 30C may induce an electrical interaction with magnets of the rotor 20.

A busbar 40 is disposed above the stator 30. The busbar 40 includes a busbar holder (not shown) formed of an insulating material and a plurality of terminals (not shown) coupled to the busbar holder. In this case, the busbar holder is formed of the insulating material to inhibit connection between the plurality of terminals. In addition, the plurality of terminals connect the coils 30C wound around the stator core 30A and apply a current to the coils.

The housing 50 accommodates the rotor 20 and the stator 30.

Figure 2:
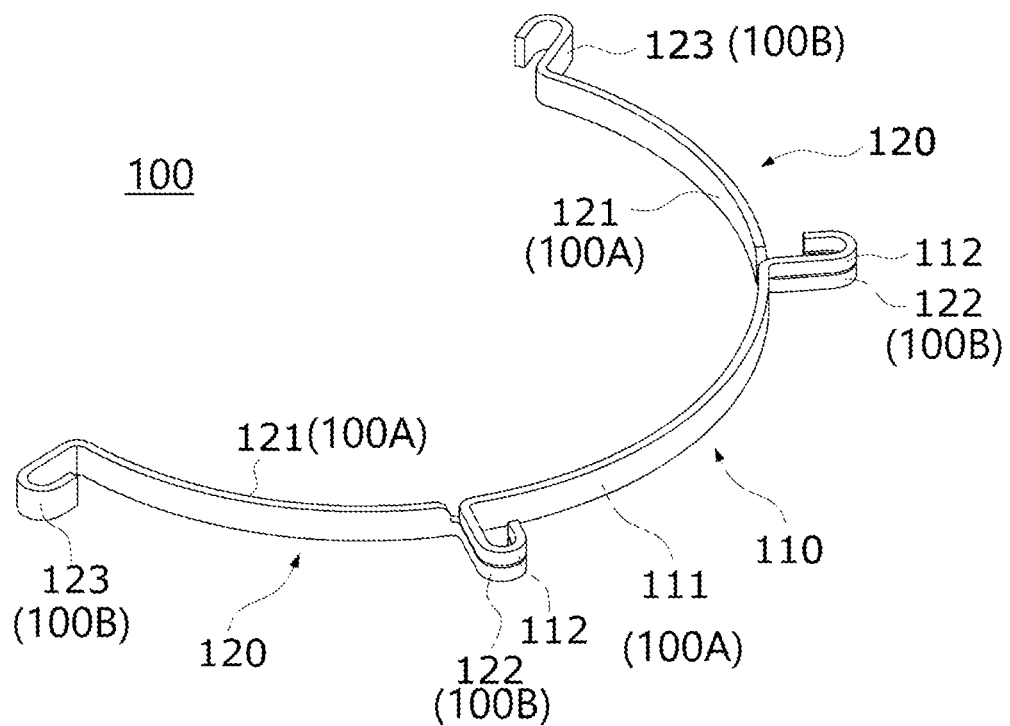
FIG. 2 is a perspective view illustrating a terminal of a busbar.

FIG. 2 is a perspective view illustrating a terminal 100 of the busbar 40.

Referring to FIGS. 1 and 2, the terminal 100 of the busbar may be a phase terminal connected to a power source of a U-phase, a V-phase, and a W-phase, or a neutral terminal electrically connecting phase terminals. The terminal 100 may include bodies 100A and a plurality of connection ends 100B extending from the bodies 100A. The bodies may have curved surfaces. The connection ends 100B are ends fused to the coils 30C. The connection ends 100B may extend to be bent outward or inward from the bodies. The connection ends 100B may have shapes bent in a direction parallel to a direction of the axial center to surround end portions of the coils 30C extending upward from lower sides thereof. The terminal 100 may be fixed by a molded portion.

When the terminal 100 is manufactured from one plate member to include the connection ends 100B, a shape of the development figure of the terminal 100 is complicated. Accordingly, in order to simplify the shape of the development figure of the terminal 100, in the motor according to the embodiment, the busbar is manufactured by combining unit terminals.

The terminal 100 may be formed by combining a first terminal 110 and second terminals 120. The first terminal 110 and the second terminals 120 may be consecutively disposed in the circumferential direction of the busbar 40. For example, the first terminal 110 may be disposed between two second terminals 120 in the circumferential direction of the busbar 40. The first terminal 110 and the second terminals 120 may share the connection ends 100B. This is to reduce an amount of scraps by simplifying development patterns of the first terminal 110 and the second terminals 120.

The first terminal 110 may include a first body 111 and first extension parts 112. The first extension parts 112 may be disposed at one end of the first body 111.

The second terminals 120 may include second bodies 121 and second extension parts 122. The second extension parts 122 may be disposed at one ends of the second bodies 121.

In addition, the first terminal 110 may further include a third extension part 113, and the second terminals 120 may further include fourth extension parts 123. The third extension part 113 may be disposed at the other end of the first body 111, and the fourth extension parts 123 may be disposed at the other ends of the second bodies 121.

The first extension parts 112 and the second extension parts 122 are combined to constitute connection ends 100B connected to the coils 30C. The first extension parts 112 and the second extension parts 122 are disposed to overlap in the axial direction.

Figure 3:
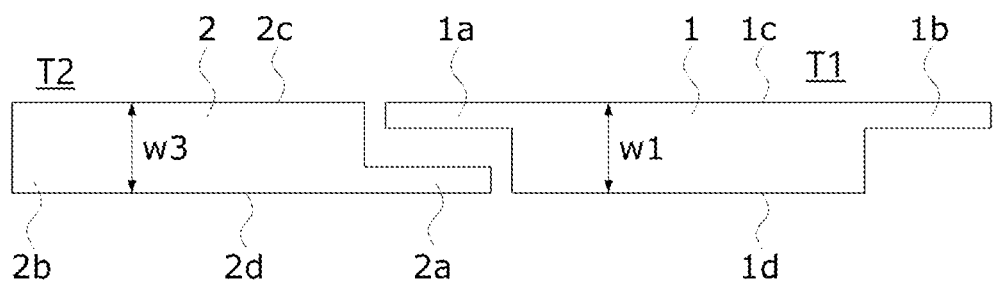
FIG. 3 is a view illustrating a first development pattern of a first terminal and a second development pattern of a second terminal.

FIG. 3 is a view illustrating a first development pattern T1 of the first terminal 110 and a second development pattern T2 of the second terminal 120.

Referring to FIGS. 2 and 3, the first development pattern T1 is a portion for forming the first terminal 110 from the plate member. The second development pattern T2 is a portion for forming the second terminal 120 from the plate member.

The first development pattern T1 may include a first part 1, a second part 1a extending from one end of the first part 1, and a third part 1b extending from the first part 1. The first part 1 is a portion for forming the first body 111 and has a rectangular structure. The second part 1a and the third part 1b are portions constituting the first and third extension parts 112 and 113, respectively.

The second development pattern T2 may include a fourth part 2, a fifth part 2a extending from one end of the fourth part 2, and a sixth part 2b extending from the other end of the fourth part 2. The fourth part 2 is a portion for forming the second body 121 and having a rectangular structure. The fifth part 2a is a portion for forming the second extension part 122, and the sixth part 2b is a portion for forming the fourth extension part 123.

An upper edge 1c of the first development pattern T1 and an upper edge 2c of the second development pattern T2 are disposed to be colinear with each other. In addition, a lower edge 1d of the first development pattern T1 and a lower edge 2d of the second development pattern T2 are disposed to be colinear with each other. Accordingly, a width w1 of the first development pattern T1 and a width w3 of the second development pattern T2 are the same. The second part 1a and the fifth part 2a are disposed to overlap vertically.

Since such repeated development patterns may be formed in a strap type member having a predetermined width, an amount of scraps can be significantly reduced.

Figure 4:
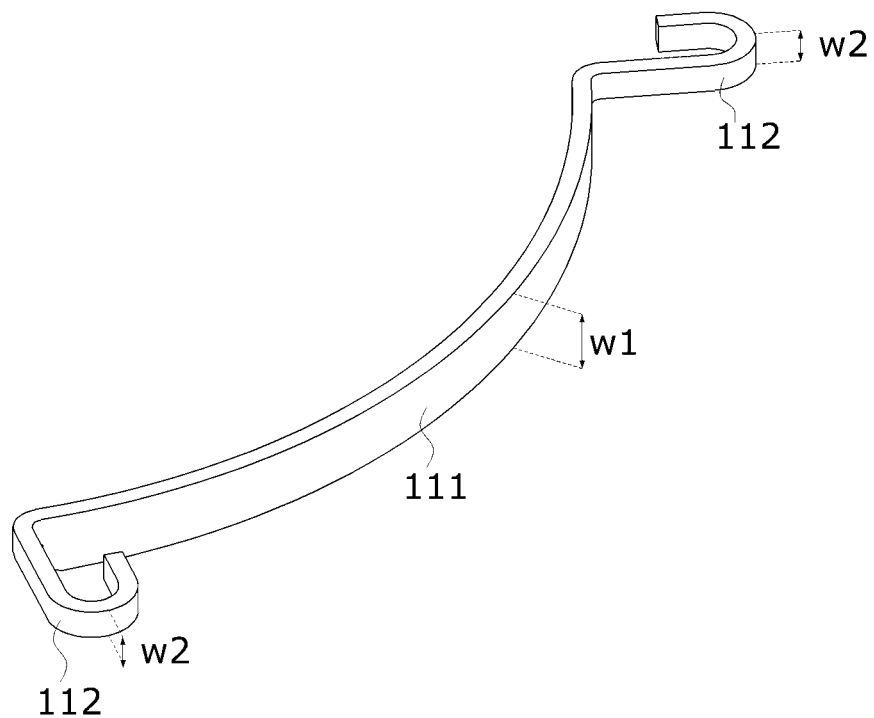
FIG. 4 is a perspective view illustrating the first terminal.
Figure 5:
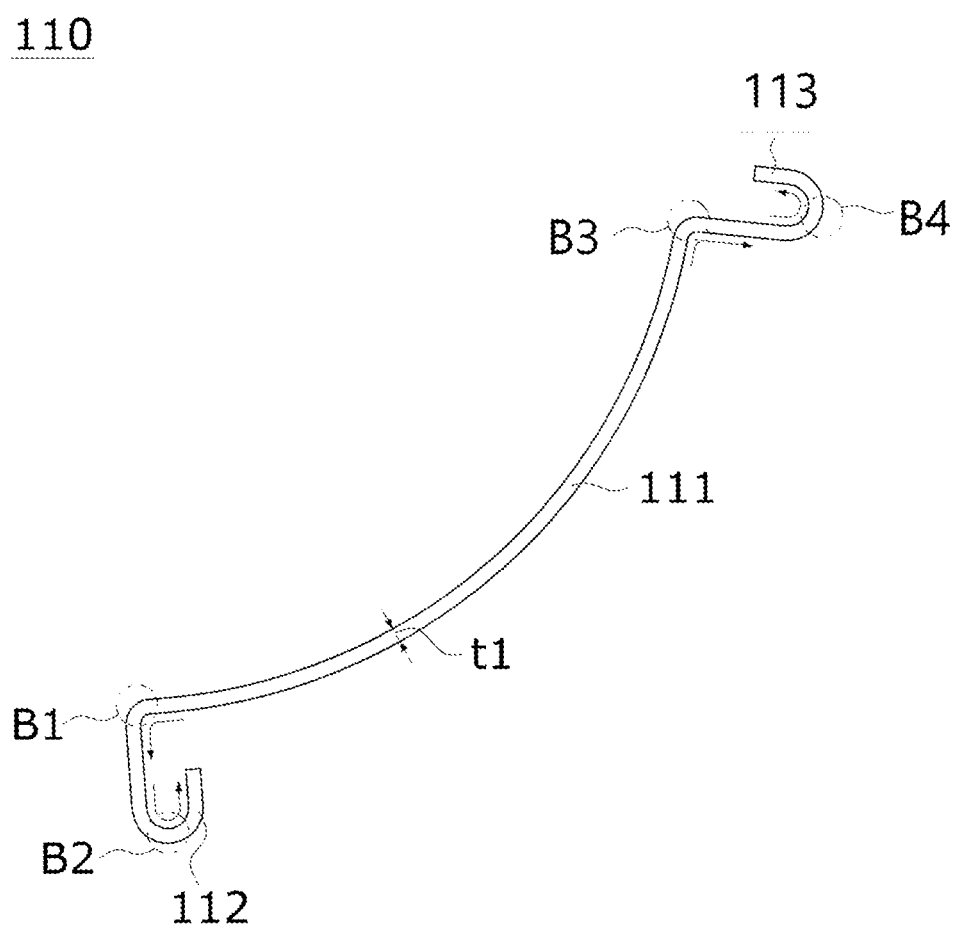
FIG. 5 is a plan view illustrating the first terminal.

FIG. 4 is a perspective view illustrating the first terminal 110, and FIG. 5 is a plan view illustrating the first terminal 100.

Referring to FIGS. 4 and 5, the first body 111 may have a curved surface. The first body 111 may be a flat member of which a thickness t1 is smaller than the width w1. The first body 111 may have a shape standing in the axial direction. The first and third extension parts 112 and 113 are disposed at both end portions of the first body 111. A width w2 of each of the first and third extension parts 112 and 113 is smaller than the width w1 of the extension part of the first body 111. This is because the width w2 of the first extension part 112 should be smaller than the width w1 of the first body 111 in order to secure a region of the second extension part 122 overlapping the first extension part 112 in the plate member.

As illustrated in FIG. 5, the first extension part 112 may be bent outward from the end portion of the first body 111 and disposed further outward than the first body 111. Alternatively, although not illustrated in the drawings, the first extension part 112 may also be bent inward from the end portion of the first body 111 and disposed further inward than the first body 111. For example, the first extension part 112 may include a first bent part B1 and a second bent part B2. The first bent part B1 is connected to one end portion of the first body 111. The second bent part B2 is connected to the first bent part B1. The third extension part 113 may include a third bent part B3 and a fourth bent part B4. The third bent part B3 is connected to the other end portion of the first body 111. The fourth bent part B4 is connected to the third bent part B3.

A direction in which the first bent part B1 is bent and a direction in which the third bent part B3 is bent may be opposite to each other. The direction in which the first bent part B1 is bent and a direction in which the second bent part B2 is bent may be the same. The direction in which the third bent part B3 is bent and a direction in which the fourth bent part B4 is bent may be different from each other.

Figure 6:
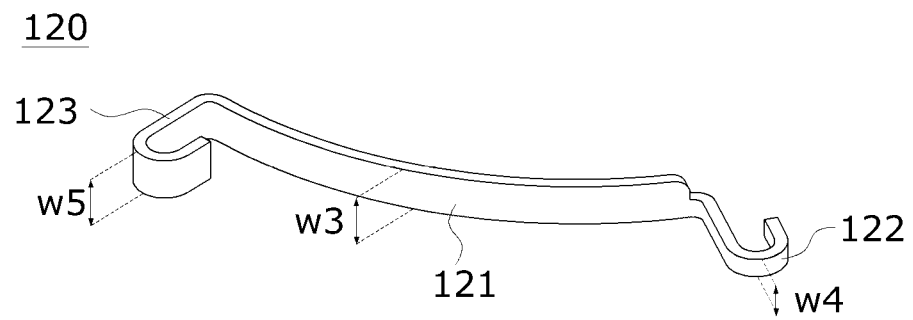
FIG. 6 is a perspective view illustrating the second terminal.
Figure 7:
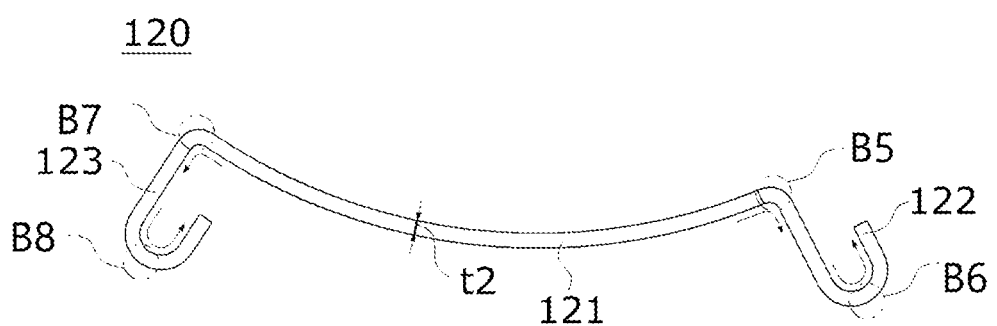
FIG. 7 is a plan view illustrating the second terminal.

FIG. 6 is a perspective view illustrating the second terminal 120, and FIG. 7 is a plan view illustrating the second terminal 120.

Referring to FIGS. 6 and 7, the second body 121 may have a curved surface. The second body 121 may be a flat member of which a thickness t2 is smaller than the width w3. The second body 121 may have a shape standing in the axial direction. The second extension part 122 is disposed on one end portion of the second body 121. The width w4 of the second extension part 122 is smaller than a width w4 of the extension part of the second body 121. This is because the width w4 of the second extension part 122 should be smaller than the width w3 of the extension part of the second body 121 in order to secure a region of the first extension part 112 overlapping the second extension part 122 in the plate member.

The fourth extension part 123 is disposed on the other end portion of the second body 121. A width w5 of the fourth extension part 123 may be the same as the width w3 of the second body 121.

As illustrated in FIG. 7, the second extension part 122 may be bent outward from an end portion of the second body 121 and disposed further outward from the second body 121. Alternatively, although not illustrated in the drawings, the second extension part 122 may also be bent inward from the end portion of the second body 121 and disposed further inward than the second body 121. For example, the second extension part 122 may include a fifth bent part B5 and a sixth bent part B6. The fifth bent part B5 is connected to the second body 121. The sixth bent part B6 is connected to the fifth bent part B5. A direction in which the fifth bent part B5 is bent and a direction in which the sixth bent part B6 is bent may be different.

The fourth extension part 123 may include a seventh bent part B7 and an eighth bent part B8. The seventh bent part B7 is connected to the second body 121. The eighth bent part B8 may be connected to the seventh bent part B7. A direction in which the seventh bent part B7 is bent and a direction in which the eighth bent part B8 is bent may be the same.

Meanwhile, the direction in which the first bent part B1 is bent and the direction in which the fifth bent part B5 is bent may be opposite to each other, and the direction in which the second bent part B2 is bent and the direction in which the sixth bent part B6 is bent may be the same. This is a structure for the first terminal 110 and the second terminal 120, which are consecutively adjacent to each other, to share the connection ends 100B and is for arranging the first extension part 112 and the second extension part 122 to overlap in the axial direction.

Figure 8:
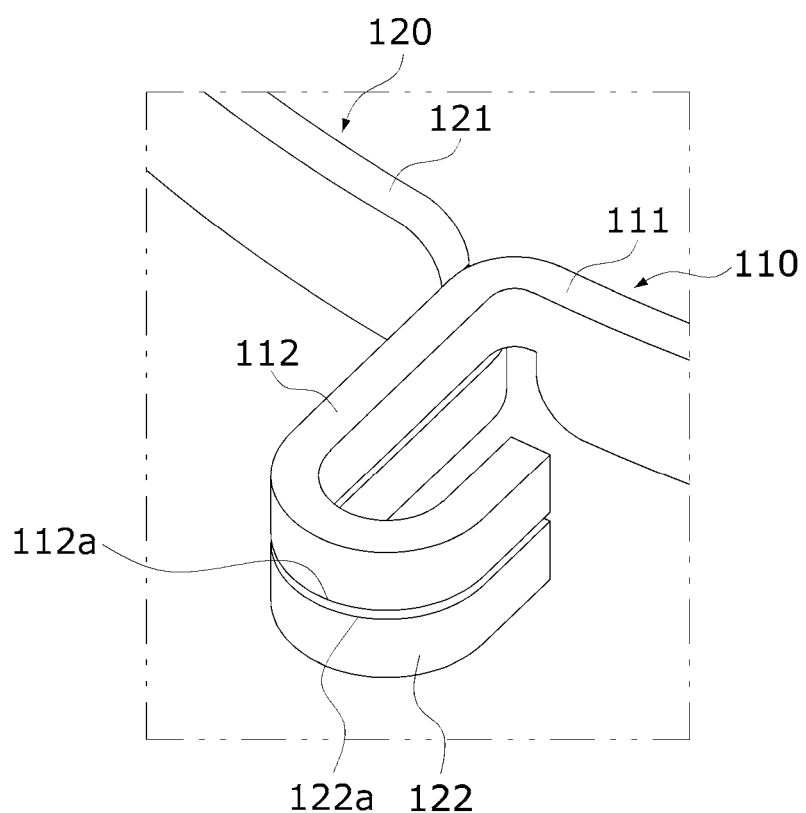
FIG. 8 is a view illustrating a first extension part and a second extension part which are disposed to overlap in an axial direction.

FIG. 8 is a view illustrating the first extension part 112 and the second extension part 122 which are disposed to overlap in the axial direction.

Referring to FIGS. 3 and 8, from the plate member, the first extension part 112 and the second extension part 122 may be formed by arranging and bending both the second part 1a and the fifth part 2a to overlap in the axial direction. Accordingly, a curvature of the second bent part B2 of the first extension part 112 and a curvature of the sixth bent part B6 of the second extension part 122 may be the same. In addition, since the first extension part 112 and the second extension part 122 are formed through one bending process, there is an advantage of reducing the number of bending processes. Since the number of bending processes is reduced, a possibility of a coated portion of the first terminal 110 or the second terminal 120 being scratched or torn can be significantly reduced.

The end portion of the coil 30C is disposed inside the first extension part 112 and the second extension part 122, and the disposed end portion of the coil 30C, the first extension part 112, and the second extension part 122 are fused and connected. As a result, the first extension part 112 and the second extension part 122 are in contact with the same end portion of the coil 30C.

After the first extension part 112 and the second extension part 122 are formed by bending both the second part 1a and the fifth part 2a, the first body 111 and the second body 121 may be formed by bending both the first part 1 and the fourth part 2.

In a state in which the first extension part 112 and the second extension part 122 overlap in the axial direction, a lower surface 112a of the first extension part 112 and an upper surface 122a of the second extension part 122 may be disposed apart from each other as illustrated in FIG. 8, and in a process in which the first terminal 110 and the second terminal 120 are fixed to a mold, the lower surface 112a of the first extension part 112 and the upper surface 122a of the second extension part 122 may also be in contact with each other.

Figure 9:
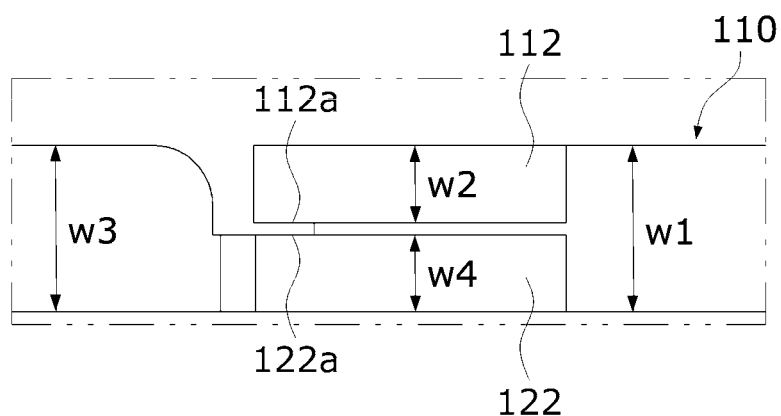
FIG. 9 is a side view illustrating the first extension part and the second extension part.

FIG. 9 is a side view illustrating the first extension part 112 and the second extension part 122.

Referring to FIGS. 3 and 9, due to characteristics of the first development pattern T1 and the second development pattern T2, the width w1 of the first body 111 and the width w3 of the second body 121 should be the same, and a sum of the width w2 of the first extension part 112 and the width w4 of the second extension part 122 should be smaller than the width w1 of the first body 111 or the width w3 of the second body 121. Accordingly, there are advantages of significantly reducing a vertical length of the busbar, and further, reducing a size of a motor.

In the above-described embodiment, an example of an inner rotor type motor has been described, but the present invention is not limited thereto. The present invention may also be applied to an outer rotor type motor. In addition, the present invention may be used in various devices for vehicles, home appliances, or the like.

The invention claimed is:

1. A motor comprising:
    a shaft;
    a rotor coupled to the shaft;
    a stator disposed to correspond to the rotor; and
    a busbar disposed above the stator,
    wherein the stator includes a stator core and coils,
    the busbar includes a first terminal and a second terminal that are connected to the coils,
    the first terminal includes a first body, a first extension part extending from one end portion of the first body, and a third extension part extending from another end portion of the first body,
    the second terminal includes a second body, a second extension part extending from one end portion of the second body, and a fourth extension part extending from another end portion of the second body,
    the fourth extension part overlaps the first extension part, the second extension part, and the third extension part in a circumferential direction of the shaft,
    the first extension part and the second extension part are disposed to overlap in an axial direction, and
    the first extension part and the second extension part are in contact with a same end portion of the coils.

2. The motor of claim 1, wherein:
    an overlap region of the first terminal and the second terminal in the axial direction is in contact with the same end portion of the coil.

3. The motor of claim 1, wherein:
    a width of the first body is same as a width of the second body;
    a width of the first extension part is smaller than the width of the first body; and
    a width of the second extension part is smaller than the width of the second body.

4. The motor of claim 3, wherein a sum of the width of the first extension part and the width of the second extension part is smaller than the width of the first body or the width of the second body.

5. The motor of claim 1, wherein:
    a width of the first extension part and a width of the second extension part are same; and
    the width of the second extension part and a width of the fourth extension part are different from each other.

6. The motor of claim 1, wherein:
    the first extension part includes a first bent part connected to the first body and a second bent part connected to the first bent part;
    the second extension part includes a third bent part connected to the second body and a fourth bent part connected to the third bent part;
    a direction in which the first bent part is bent and a direction in which the third bent part is bent are opposite to each other in the circumferential direction of the shaft; and
    a direction in which the second bent part is bent and a direction in which the fourth bent part is bent are the same based on the circumferential direction of the shaft.

7. A motor comprising:
    a shaft;
    a rotor coupled to the shaft;
    a stator disposed to correspond to the rotor, including a stator core and coils; and
    a busbar including terminals electrically connected to the stator,
    wherein:
    one of the terminals of the busbar includes a body and a plurality of extension parts provided to the body and connected to some of the coils,
    the plurality of extension parts are positioned in a space having a maximum width of the terminal, and
    at least two of the plurality of extension parts are formed with different widths.

8. The motor of claim 7, wherein the body is formed by connecting at least two members.

9. The motor of claim 8, wherein the at least two members are arranged in a circumferential direction.

10. The motor of claim 9, wherein the plurality of extension parts are formed to radially protrude out of the members arranged in the circumferential direction.

11. The motor of claim 9, wherein the plurality of extension parts overlap in the circumferential direction.

12. The motor of claim 8, wherein the at least two members include extension parts respectively formed at both ends of each of the at least two members.

13. The motor of claim 12, wherein the extension parts of the at least two members contacting each other between the members are overlapped in an axial direction.

14. The motor of claim 7, wherein the plurality of extension parts are bent in a same direction.

\* \* \* \* \*